United States Patent
O'Cualain et al.

(10) Patent No.: US 9,340,156 B2
(45) Date of Patent: May 17, 2016

(54) METHOD FOR DETECTING AN OBJECT IN AN ENVIRONMENTAL REGION OF A MOTOR VEHICLE BY MEANS OF A CAMERA SYSTEM OF THE MOTOR VEHICLE, CAMERA SYSTEM AND MOTOR VEHICLE

(71) Applicant: Connaught Electronics Ltd., Tuam, County Galway (IE)

(72) Inventors: Diarmad O'Cualain, Indreabhan (IE); Martin Glavin, Turloughmore (IE); Edward Jones, Galway (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 14/686,160

(22) Filed: Apr. 14, 2015

(65) Prior Publication Data
US 2015/0291097 A1    Oct. 15, 2015

(30) Foreign Application Priority Data
Apr. 14, 2014   (DE) .......................... 10 2014 105 297

(51) Int. Cl.
*H04N 7/18*    (2006.01)
*B60R 1/00*    (2006.01)
(Continued)

(52) U.S. Cl.
CPC .............. *B60R 1/00* (2013.01); *G06K 9/00805* (2013.01); *G06K 9/2036* (2013.01); *G06K 9/4604* (2013.01); *H04N 7/183* (2013.01); *B60R 2300/10* (2013.01)

(58) Field of Classification Search
CPC .............. H04N 7/183; B60R 2300/30; B60R 2300/404; B60R 2300/80; B60R 2300/8093; B60R 2300/806; G06K 9/00805
USPC .......................................................... 348/148
See application file for complete search history.

(56) References Cited

U.S. PATENT DOCUMENTS

| 5,949,331 A | 9/1999 | Schofield et al. |
| 6,424,273 B1 | 7/2002 | Gutta et al. |

(Continued)

FOREIGN PATENT DOCUMENTS

| DE | 102007022523 A1 | 11/2008 |
| DE | 102010020201 A1 | 5/2011 |

(Continued)

OTHER PUBLICATIONS

Broggi, Alberto, "Multi-Resolution Vehicle Detection Using Artificial Vision", 2004 IEEE Intelligent Vehicles Symposium, Jniversity of Parma, Parma, Italy, Jun. 14-17, 2004 (5 pages).

(Continued)

*Primary Examiner* — Hee-Yong Kim
(74) *Attorney, Agent, or Firm* — Osha Liang LLP

(57) ABSTRACT

A method for detecting an object in an environmental region of a motor vehicle by a camera system of the motor vehicle is disclosed. A first image of the environmental region is provided by a camera of the camera system with illumination of the environmental region using a light source of the motor vehicle such that a shadow of the object caused by the illumination is depicted in the first image. A second image of the environmental region is also provided by the camera in an inactive state of the light source, in which the illumination is omitted. Then, a subtraction image is generated by subtracting one of the images from the other image by an image processing device of the camera system. Then, an edge image is generated from the subtraction image, and the object is detected based on edges of the edge image by the image processing device.

14 Claims, 3 Drawing Sheets

Figure 1:
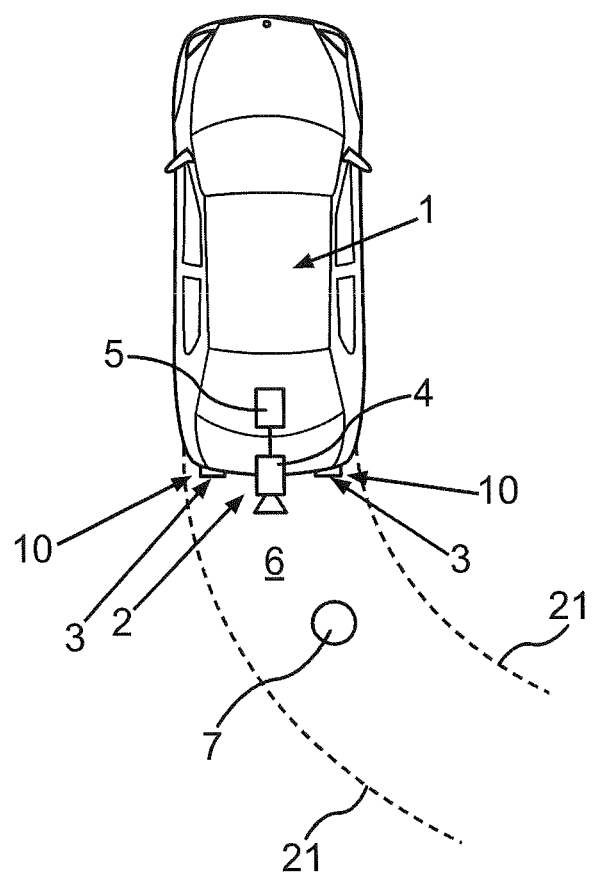

(51) Int. Cl.
*G06K 9/00* (2006.01)
*G06K 9/20* (2006.01)
*G06K 9/46* (2006.01)

(56) References Cited

U.S. PATENT DOCUMENTS

| | | | |
|---|---|---|---|
| 6,553,130 B1 | 4/2003 | Lemelson et al. | |
| 6,678,598 B1 * | 1/2004 | Hillebrand | G01S 7/4802 180/268 |
| 7,295,771 B2 * | 11/2007 | Fox | G06K 9/00791 348/148 |
| 7,859,565 B2 | 12/2010 | Schofield et al. | |
| 8,386,114 B2 | 2/2013 | Higgins-Luthman | |
| 8,543,330 B2 | 9/2013 | Taylor et al. | |
| 8,643,724 B2 | 2/2014 | Schofield et al. | |
| 2004/0164228 A1 | 8/2004 | Fogg et al. | |
| 2008/0266396 A1 * | 10/2008 | Stein | G06K 9/00805 348/148 |
| 2009/0087025 A1 * | 4/2009 | Ma | G06K 9/00771 382/103 |
| 2012/0233841 A1 | 9/2012 | Stein | |
| 2014/0043483 A1 | 2/2014 | Schuder et al. | |
| 2014/0085471 A1 | 3/2014 | Han | |
| 2015/0071490 A1 * | 3/2015 | Fukata | G06K 9/00791 382/103 |

FOREIGN PATENT DOCUMENTS

| | | |
|---|---|---|
| EP | 2731828 B1 | 12/2014 |
| JP | S59114139 A | 7/1984 |
| JP | S64-14700 | 1/1989 |
| JP | H2-36417 B2 | 8/1990 |
| JP | H02-117935 U | 9/1990 |
| JP | 3-99952 A | 4/1991 |
| JP | H0730149 U | 6/1995 |
| JP | 2000-146547 A | 5/2000 |
| JP | 5295254 B2 | 6/2013 |

OTHER PUBLICATIONS

Kastrinaki, V. "A Survey of Video Processing Techniques for Traffic Applications", Image and Vision Computing 21, Digital Image and Signal Processing Laboratory, Department of Electronics and Computing Engineering, Technical University of Crete, Chania, Greece, accepted Jan. 15, 2003, pp. 359-381 (23 pages).

Extended European Search Report issued in corresponding European Application No. 15163509.1 dated Oct. 12, 2015 (8 pages).

Burkard, Wördenweber et al., "Automotive Lighting and Human Vision" In: "Automotive Lighting and Human Vision", Sep. 28, 2007, Springer, XP55216379, ISBN: 978-3-54-036696-6, pp. 23-28, (7 pages).

* cited by examiner

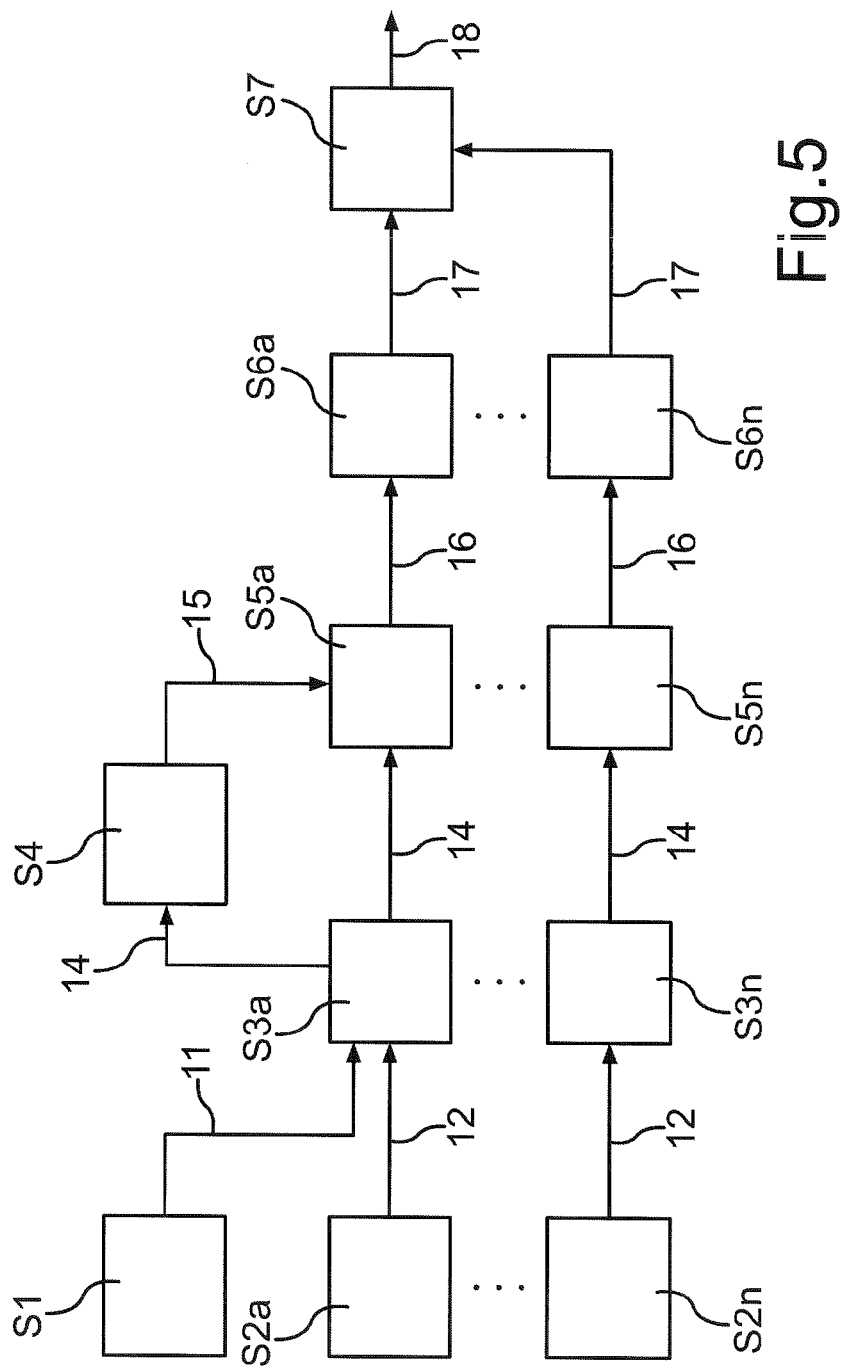

METHOD FOR DETECTING AN OBJECT IN AN ENVIRONMENTAL REGION OF A MOTOR VEHICLE BY MEANS OF A CAMERA SYSTEM OF THE MOTOR VEHICLE, CAMERA SYSTEM AND MOTOR VEHICLE

The invention relates to a method for detecting an object in an environmental region of a motor vehicle by means of a camera system of the motor vehicle. In addition, the invention relates to a camera system for a motor vehicle, which is formed for performing such a method, as well as to a motor vehicle with such a camera system.

From the prior art, methods are already known in order to detect objects in an environmental region of a motor vehicle. Thus, an ultrasonic sensor is for example employed to detect objects in the environmental region. The ultrasonic sensor emits ultrasonic waves which are reflected from the object, wherein the reflected waves are then again received by the ultrasonic sensor and the object is thus detected. Due to the propagation time measurement, i.e. the time elapsing between the emission and the reception of the ultrasonic waves, a distance to the object can be calculated considering the known sonic speed.

A rear view camera offers a further possibility of detecting objects in the environmental region of a motor vehicle, which provides an image of the environmental region behind the motor vehicle. Then, the image can be displayed on a display in the motor vehicle such that the driver can estimate himself the distance to the object and thus assess himself whether or not the object presents a risk to the motor vehicle. However, it is also known in the prior art that an automatic method from the field of machine vision is applied for detecting objects. Such methods can for example be based on the classical feature extraction (e.g. Haar feature) and the machine learning (e.g. support vector machine). The result is then displayed to the driver for example in a display.

Furthermore, methods are known, which are based on the principle of "Inverse Perspective Mapping" (IPM). In this case, a plan view image of the environmental region is generated—a so-called "bird-eye view". Now, the driver can easier estimate how close the object is to the motor vehicle and if it thus presents a relevant obstacle. In this case too, the plan view image is displayed to the driver on the display and optionally, an acoustic warning is output if the obstacle is in the vicinity of the motor vehicle.

It is disadvantageous in the mentioned prior art that in case of the ultrasonic sensor, often, several ultrasonic sensors have to be used to monitor the entire environmental region. In addition, it can occur that objects, which are not flat and/or large enough, cannot be recognized by the ultrasonic sensor because the emitted ultrasonic waves are not reflected with sufficient strength to be detected. This can in particular be a problem with narrow pillars or elongated objects.

A disadvantage in the known camera systems, in particular in the known rear view cameras, in which the images are only displayed on the display, is in that the driver can find it difficult to accurately estimate how far away the detected object is located. This is because relative distances between the displayed objects are not linear. In addition, the reaction time of the driver is also added, with which the driver is capable of perceiving the displayed objects anyway. In the case of the automatic object detection, it is in turn disadvantageous that a height value cannot be assigned to the objects, and thus it cannot be differentiated between ground markings and actual obstacles. Thus, for example, a flat object lying on the ground such as for example a ground marking does not present an obstacle to the motor vehicle, but can be nevertheless detected and displayed in the prior art. This results in a false alarm.

A disadvantage of the above mentioned plan view image is in turn in that information in the vicinity or above the horizon cannot be displayed to the driver. This results in images displaying the detected objects distorted in height and/or truncated, namely also such that these objects are no longer recognizable to the driver. With the methods from the prior art, it is therefore not possible to precisely consider the height of the detected objects with a camera and thus to differentiate between obstacle and non-obstacle.

It is the object of the invention to provide a method, a camera system as well as a motor vehicle, in which measures are taken, which ensure that objects can be precisely and reliably detected.

According to the invention, this object is solved by a method, by a camera system as well as by a motor vehicle having the features according to the respective independent claims. Advantageous implementations of the invention are the subject matter of the dependent claims, of the description and of the figures.

A method according to the invention serves for detecting an object in an environmental region of a motor vehicle by means of a camera system of the motor vehicle. A first image of the environmental region is provided by a camera of the camera system with illumination of the environmental region by means of at least one light source of the motor vehicle such that a shadow of the object caused by the illumination is depicted in the first image. A second image of the environmental region is also provided by the camera in an inactive state of the light source, in which the illumination is omitted. Then, a subtraction image is generated by subtracting one of the images from the other image by an image processing device of the camera system.

The subtraction image is then divided by a maximum image in order to each obtain a ratio image. Step edges with negative transition are searched in each ratio image. These step edges with negative transition are searched along a respective epipolar line of the ratio image starting from an epipole of the ratio image. The epipole is the pixel of an image, which is pierced in the image plane if a projection center of the camera is connected to the position of the light source with a straight line. An epipolar plane is spanned by the three points: the projection center of the camera, the position of the light source and the position of the object or the shadow of the object. The epipolar plane respectively intersects the ratio image in the epipolar line. Finally, an edge image with edges is generated from all of the step edges with negative transition, which partially or completely depicts a contour of the object. The object is detected based on edges of the edge image or the contour by the image processing device.

In other words, an edge image is generated, which depends on the shadows of the objects to be detected in the image. The shadows arise by illuminating the environmental region with a light source or with multiple light sources of the motor vehicle at the same time. The proposed method provides an edge image with edges of objects having a certain height above the ground and thus presenting actual obstacles to the motor vehicle. In comparison, for example in case of ground markings, no shadow is generated. Accordingly, the method is advantageous in that it can be differentiated between objects and ground markings, and only obstacles, thus objects with a certain height, are displayed or signaled to the driver. This results in reduction of the false alarm rate and increases the safety feeling of the driver. The detection of the objects is therefore overall particularly precisely and reliably effected.

Preferably, the camera is a video camera, which provides a temporal sequence of images of the environmental region.

Preferably, the camera has an image sensor, which is sensitive to the visible spectral range and thus is able to detect light in the visible spectral range and therefore provide images. Preferably, the image sensor is a color sensitive sensor. The image sensor can for example be a CCD sensor or a CMOS sensor.

The illumination of the environmental region by means of the light source is preferably also effected in the visible spectral range, i.e. by light with a frequency located in the visible spectral range.

However, the invention is not restricted to an illumination in the visible spectral range, and a light source can alternatively be employed, which illuminates the environmental region with invisible light, for example with infrared light. Then, a camera with an image sensor is correspondingly also employed, which is sensitive to this light.

Preferably, the camera is a rear view camera—i.e. a rear camera—which is for example disposed behind a rear window of the motor vehicle and/or on a tailgate. The rear camera then captures the environment in vehicle longitudinal direction behind the motor vehicle. However, a front camera can also be employed as the camera, which captures the environment in front of the motor vehicle. Generally, it can be provided that a camera axis extending perpendicularly to the plane of the image sensor is oriented parallel to the vehicle longitudinal axis.

In particular, it is provided that it is differentiated in the object between an obstacle raised above a ground on the one hand and a ground marking on the other hand. Therein, in particular, objects are only detected and displayed, which have a minimum height above the ground, thus can present an obstacle to the motor vehicle. This is possible since objects having a certain height, cast a shadow on the ground, which in turn can be detected by the image processing device based on the edge image. The minimum height is for example in a single-digit centimeter range. The advantage is that in cases, in which the object is not an obstacle, a false alarm is not triggered.

Preferably, a distance of the detected object from the motor vehicle is calculated by the image processing device based on the edge image. Herein, in particular, an internal and/or external orientation of the camera can also be taken into account. The internal and external orientation are calibration data of the camera system, wherein the internal orientation describes the position of a projection center related to an image plane. In contrast, the external orientation describes the posture and position of the camera during capture related to the item of capture or the object. The advantage of the calculated distance is that the driver does no longer have to estimate alone how far away he is from the object and if it presents an obstacle or a risk. The distance can be indicated visually in a display and/or acoustically and/or haptically to the driver.

In a mode of development, it is provided that a prospective trajectory of the motor vehicle is determined based on at least one traveling parameter of the motor vehicle, in particular at least based on a current steering angle of the motor vehicle, and the detected object is classified depending on the prospective trajectory. The trajectory of the motor vehicle is a traveling path or a traveling pipe or a region of the roadway, which is presumably traveled by the motor vehicle with given steering angle. Therein, the current steering angle can for example be tapped on a CAN bus. The trajectory can also be determined depending on sensor data of other sensors, which can for example also be tapped from the CAN bus. By the determination of the trajectory, it can be precisely determined whether or not the detected object will presumably collide with the motor vehicle and thus presents a potential risk. The association of the object with a predetermined class can be understood by classification. Classes can for example be "risk" and "no risk". Objects can for example be associated with the class "risk", which are on the prospective trajectory. In comparison, objects located outside of the trajectory can be classified in the class "no risk". It is advantageous that only objects can be signaled to the driver, which are on the future trajectory and thus are relevant. However, it is also possible to divide objects in "item" and "living entity". Basically, the number of the classes can be arbitrarily selected.

In a further development, it is provided that a warning signal is output by the image processing device depending on the distance and/or depending on the classification of the object, by means of which a driver of the motor vehicle is warned of the object. The warning signal can be output visually in a display and/or acoustically via speakers and/or haptically. The advantage is that the driver himself does not have to constantly look for the object or the obstacle.

In particular, it is provided that the environmental region is illuminated by at least one vehicle light of the motor vehicle, in particular at least one taillight and/or one headlight, as the light source. This means that a light of the motor vehicle already present anyway can also be used for illuminating the environmental region for capturing the image. Thus, the employment of separate lights with the disadvantages associated therewith with respect to the cost and the valuable installation space is optionally unnecessary. In addition, thereby, the simple retrofitting of the method in present camera systems is also possible.

Preferably, the light source is alternately switched with a predetermined switching frequency between the inactive state and an active state, in which the light source illuminates the environmental region—in the manner of a stroboscope. Then, a sequence of images of the environmental region can be provided by the camera, and a frame rate of the camera can be adjusted depending on the switching frequency. Therein, the frame rate can for example be synchronized with the switching frequency of the light source. The switching frequency can be set such that the repeated change between the inactive and the active state of the light source is not perceivable for the human eye. Thus, the switching frequency can be chosen greater than 75 Hz, preferably greater than 100 Hz. It is advantageous that the illumination is perceived as a permanent illumination by a human and thus does not present a threat to other traffic participants.

In an embodiment, it is provided that a third image of the environmental region is provided by the camera with illumination of the environmental region with at least one further (second) light source, which is disposed in a distance to the one (first) light source, in the inactive state of the first light source. Then, a further subtraction image can be provided from the first and the third image by the image processing device, and the edge image can be generated depending on the one (first) subtraction image and the further (second) subtraction image. Herein, it can be provided that a maximum image is generated from the subtraction images, which has the same size and thus the same number of pixels as the subtraction images and in which each pixel corresponds to the maximum intensity value of the corresponding pixels of the subtraction images—i.e. having the same coordinate. Subsequently, each subtraction image can be divided by the maximum image to obtain a ratio image respectively for each subtraction image. In order to extract the edges, now, it is proceeded as follows: the pixel corresponding to the epipole is determined in each ratio image. Presently, the epipole is that pixel, which is pierced in the image if the projection center of the camera is connected to the position of the active light source by means of an imagined straight line. The position of the projection center and the position of the light source span an epipolar plane, which intersects the image in the form of an epipolar line. Now, the epipolar line is generated starting from the epipole for each ratio image and each shadow point, in order to determine pixels with steep edges with negative transition of the intensity. These found pixels are then designated as edges and together result in the edge image.

A camera system according to the invention for a motor vehicle includes at least one camera for providing images of an environmental region of the motor vehicle and an image processing device adapted to perform a method according to the invention.

Furthermore, it is provided that the camera system includes a lighting control unit for controlling the light source. The lighting control unit performs switching of the light source from an inactive state to an active state and vice versa. Moreover, the lighting control unit can be used to synchronize the light source with the camera. Thus, a triggering time of the camera can be precisely determined.

In a further embodiment, the light source includes a high-pressure gas discharge lamp (HID) and/or a xenon lamp. This has the advantage that a great amount of light is available for illuminating. Compared to a halogen lamp, a high-pressure gas discharge lamp can emit equally much light with smaller construction. Furthermore, the switching frequency can be chosen correspondingly high by the high-pressure gas discharge lamp.

Additionally or alternatively, the light source includes at least one light emitting diode (LED). Light emitting diodes are advantageous because they have a long lifetime and additionally generate a relatively high light intensity with lower power consumption. In addition, light emitting diodes offer great freedom in designing the light source, which results in great freedom in developing the motor vehicle. Furthermore, the switching frequency can be selected correspondingly high by the light emitting diode. In a further embodiment, the light source includes independently controllable light emitting diodes segments each comprising several light emitting diodes. The light emitting diodes segments have the advantage that the object can be particularly accurately illuminated. Also additionally or alternatively, the light source can include at least one organic light emitting diode (OLED) or a laser.

It can further be provided that the light source comprises at least two light-emitting elements and the light-control unit is adapted to control the at least two light emitting elements, independently of each other. The light-emitting elements can be formed as described above as high-pressure gas discharge lamps, xenon lamps, light emitting diodes and/or light-emitting segments.

A motor vehicle, in particular a passenger car, includes a camera system according to the invention.

The preferred embodiments presented with respect to the method according to the invention and the advantages thereof correspondingly apply to the camera system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

Figure 2:
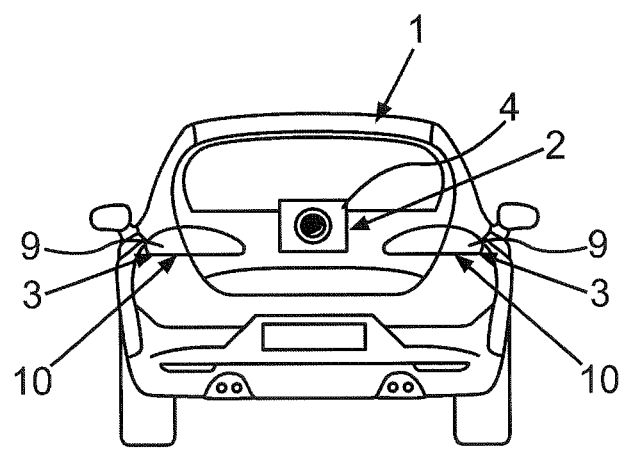
Figure 3:
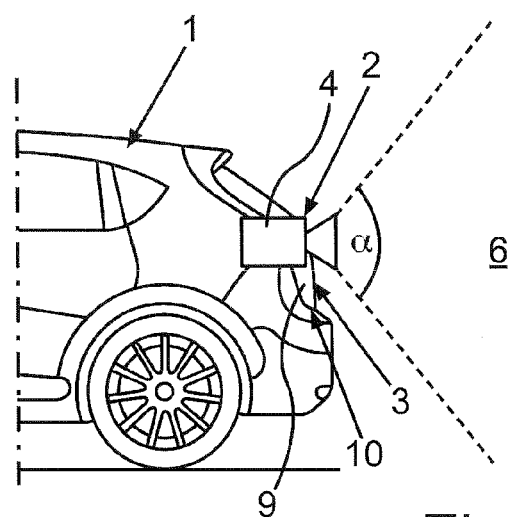
Figure 4:
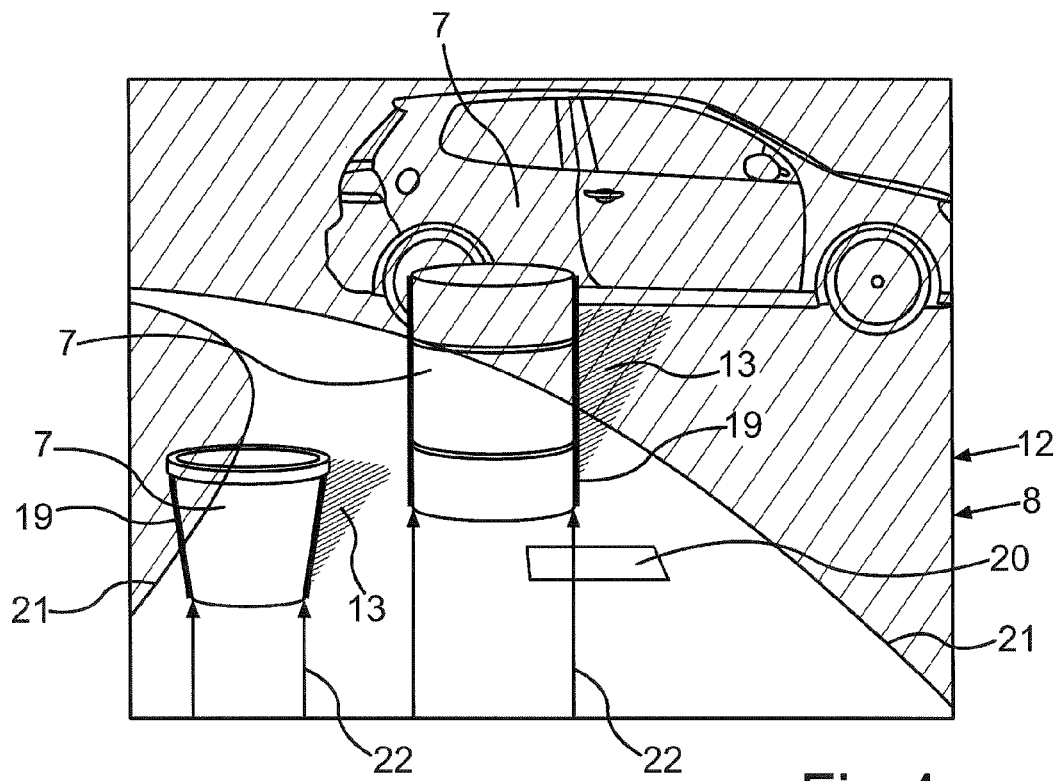

There show:

FIG. 1 in schematic plan view a motor vehicle with a camera system in reversing, wherein an object is located in a predicted trajectory of the motor vehicle;

FIG. 2 in schematic illustration a rear view of the motor vehicle with a camera of the camera system and an illuminating device;

FIG. 3 in schematic illustration a side view of the rear of the motor vehicle with the camera and a field of view of the camera directed to an environmental region of the motor vehicle;

FIG. 4 an exemplary image of the environmental region, which is captured by the camera with activated illuminating device, wherein extracted vertical edges and the trajectory are illustrated; and FIG. 5 a flow diagram of a method according to an embodiment of the invention.

In FIG. 1, a schematic plan view of a motor vehicle 1 with a camera system 2 and an illuminating device 3 according to an embodiment of the invention is illustrated. The camera system 2 includes a camera 4, a lighting control (not shown) and an image processing device 5, which can for example be integrated in the camera 4. However, this image processing device 5 can also be a component separate from the camera 4, which can be disposed in any position in the motor vehicle 1.

In the embodiment according to FIG. 1 to FIG. 3, the camera 4 is disposed in a rear region of the motor vehicle 1 and captures an environmental region 6 behind the motor vehicle 1. However, the invention is not restricted to such an arrangement of the camera 4.

The camera 4 can be a CMOS camera or else a CCD camera or any image capturing device, by which an object 7 can be detected. The camera 4 is a video camera continuously capturing a sequence of images 8. The image processing device 5 then processes the sequence of images 8 in real time and can recognize the object 7 based on this sequence of images 8 and track it over the sequence. This means that the image processing device 5 can determine the respectively current position of the object 7 relative to the motor vehicle 1. The camera 4 has a vertical capturing angle α, which can for example be in a range of values from 60° to 180°.

In one embodiment, not shown, the camera system 2 can include several cameras 4. Moreover, the camera system 2 can also be constructed as a stereo camera system.

The camera system 2 is a collision warning system and serves for warning the driver of the motor vehicle 1 of the object 7 located in the environmental region 6 of the motor vehicle 1.

The illuminating device 3 is—as is seen in FIG. 1 to FIG. 3—also disposed in the rear region of the motor vehicle 1. The illuminating device 3 illuminates the environmental region 6, which is captured by the camera 4. Presently, the illuminating device 3 is for example constituted by taillights 9 of the motor vehicle 1. However, the invention is not restricted to the use of taillights 9 of the motor vehicle 1. Additionally or alternatively, the illuminating device 3 can also include other light sources in other regions of the motor vehicle 1.

The illuminating device 3 includes several light sources 10 in the embodiment, which are able to generate light in the visible spectral range, wherein the number of the light sources 10 is not restricted. Two light sources 10 are advantageous for the proposed method since the object 7 is illuminated from different directions and thus several edges are detected; however, multiple light sources 10 can also be used. This increases the reliability and the precision of detection of the object 7.

The illuminating device 3 is formed such that it is alternately switched between an active and an inactive state with a switching frequency. The switching frequency is dependent on a camera capturing frequency, with which the images 8 are captured. For example, the switching frequency can be equal to the camera capturing frequency or be a multiple of the camera capturing frequency.

This also applies to the case if the illuminating device 3 includes several light sources 10, which are attached at different locations on the motor vehicle 1. In the simplest case, all of the light sources 10 can be synchronously operated such that the detection of the object 7 is effected based on a first image 8 with illumination and on a second image 8 without illumination. However, the switching frequency of the individual light sources 10 can also be adjusted such that an image 8 is provided without illumination and thus with the illuminating device 3 inactive, a further image 8 is provided with illumination of the environmental region 6 by a light source 10, at least another light source 10 is inactive, and then a still further image 8 is provided with illumination of the environmental region 6 by the other light source 10, while the previously used light source 10 is inactive. In this case, a camera frequency indicating the number of the captured images 8 per second can be as high as each one image 8 is captured to each situation, in which the environmental region 6 is differently illuminated.

In other words, the illumination of the environmental region 6 by the illuminating device 3 can proceed as follows, wherein in each step each one image 8 is captured by the camera 4: all of the light sources 10 inactive→exclusively at least a first light source 10 active and all of the other light sources 10 inactive→exclusively at least a second light source 10 active and all of the other light sources 10 inactive→exclusively an n-th light source 10 active and all of the other light sources 10 inactive→all of the light sources 10 inactive→ . . . .

Furthermore, it is provided that the switching frequency of an individual light source 10 is as high as it is not perceived as switching by a human eye. This means that the switching frequency can be greater than 75 Hz, preferably greater than 100 Hz. In this switching frequency range, the light source 10 appears to be permanently active to the human eye.

As the light source 10 for the illuminating device 3, a high-pressure gas discharge lamp (HID) can be provided, which is for example filled with xenon. The light output of high-pressure gas discharge lamps is greater than that of conventional halogen lamps with the same constructional size.

Additionally or alternatively, at least one light emitting diode (LED) can be provided as the light source 10. Light emitting diodes have a long lifetime and are very effective with respect to the required energy. Furthermore, a great freedom is allowed concerning the vehicle design.

Below, with reference to FIG. 5, a method according to an embodiment of the invention is explained in more detail, wherein the sequence of images 8 provided by the camera 4 is taken as a basis for the method:

In step S1, an image 11 with non-illuminated environmental region 6 is captured. According to steps S2a to S2n, images 12 are captured with illuminated environmental region 6, wherein—as explained above—an image 12 is each provided for each illumination scenario. The steps S2a to S2n thus include the capture of images 12 with the environmental region 6 illuminated by the different light sources 10. Each light source 10 is attached at a different location of the motor vehicle 1. Thus, each light source 10 generates a different shadow 13 of the object 7 (see FIG. 4), i.e. the shadow 13 is cast into different directions and thus onto different ground areas.

In step S3a to S3n, the non-illuminated image 11 is subtracted from each illuminated image 12 such that a subtraction image 14 is respectively generated for each illumination scenario. In the further step S4, a maximum image 15 is calculated from all of the subtraction images 14. The maximum image 15 respectively contains the maximum intensity value from the subtraction images 14 in the corresponding pixel position in the subtraction image 14 in each position of its pixels.

In step S5a to S5n, the subtraction images 14 are then divided by the maximum image 15 in order to each obtain a ratio image 16. In step S6a to S6n, step edges with negative transition 17 are searched in each ratio image 16. These step edges with negative transition 17 are searched along a respective epipolar line of the ratio image 16 starting from an epipole of the ratio image 16. The epipole is the pixel of an image 8, which is pierced in the image plane if a projection center of the camera 4 is connected to the position of the light source 10 with a straight line. An epipolar plane is spanned by the three points: the projection center of the camera 4, the position of the light source 10 and the position of the object 7 or the shadow of the object 7. The epipolar plane respectively intersects the ratio image 16 in the epipolar line.

Finally, in step S7, an edge image 18 with edges is generated from all of the step edges with negative transition 17, which partially or completely depicts a contour of the object 7. The completeness of the contour of the object 7 depends on the positions of the light sources 10. Based on the edges, the object 7 is finally detected.

In the present case—according to FIG. 1 to FIG. 4—two light sources 10 are present, which are attached in the taillights 9 of the motor vehicle 1. Only vertical edges 19 of the object 7 are extracted as is shown in FIG. 4. This is related to the fact that the light sources 10 and the camera 4 are located on the same height above the ground and thereby a shadow 13 for the extraction of the horizontal edges is not cast.

FIG. 4 shows the image 8 of the camera 4 with the extracted vertical edges 19 of objects 7 presenting an obstacle, thus having a certain height above the ground. Objects 7, which are flat and do not have any height, such as a flat object 20 in FIG. 4, are not detected, because here, a shadow 13 is not cast.

In addition—as shown in FIG. 4—it is provided that a classification of the object 7 is performed depending on a trajectory 21 of the motor vehicle 1. This trajectory 21 is a traveling pipe or the predicted traveling path of the motor vehicle 1, which can for example be determined by means of a steering angle and/or sensor data of other sensors of the motor vehicle 1. This sensor data including the steering angle can for example be tapped on a CAN bus of the motor vehicle 1.

Based on the trajectory 21, it can be determined whether or not a detected object 7 presumably presents a risk to the motor vehicle 1 with given steering angle.

In particular, the camera system 2 is used with calibration data of the camera 4. This calibration data is composed of an internal and an external orientation. Due to the calibration data, a distance 22 from the object 7 to the camera 4 and/or to the motor vehicle 1 can each be calculated.

The invention claimed is:

1. A method for detecting an object in an environmental region of a motor vehicle by a camera system of the motor vehicle, the method comprising:

providing a first image of the environmental region by a camera of the camera system with illumination of the environmental region using at least one light source of the motor vehicle, such that a shadow of the object caused by the illumination is depicted in the first image;

providing a second image of the environmental region by the camera in an inactive state of the light source, wherein in the second image the illumination is omitted;

providing a subtraction image by subtracting one of the first and second images from another of the first and second images by an image processing device of the camera system; and providing an edge image from the subtraction image and detecting the object based on edges of the edge image by the image processing device, the edge image associated with shadows in the first image caused by illumination of the at least one light source, wherein the light source is alternately switched with a predetermined switching frequency greater than 75 Hz between the inactive state and an active state, in which the light source illuminates the environmental region, wherein a sequence of images of the environmental region is provided by the camera and a frame rate of the camera is adjusted depending on the switching frequency.

2. The method according to claim 1, wherein in detecting the object, a differentiation is made between an obstacle raised above ground and a ground marking.

3. The method according to claim 1, wherein a distance of the detected object from the motor vehicle is calculated based on the edge image considering an internal and/or external orientation of the camera, by the image processing device.

4. The method according to claim 1, wherein based on at least one traveling parameter of the motor vehicle at least based on a current steering angle of the motor vehicle, a prospective trajectory of the motor vehicle is determined and the detected object is classified depending on the prospective trajectory.

5. The method according to claim 4, wherein depending on the classification of the object, a warning signal is output by the image processing device to warn the of the object.

6. The method according to claim 3, wherein depending on the distance, a warning signal is output by the image processing device, to warn the drive of the object.

7. The method according to claim 6, wherein the warning signal is one of an acoustic signal and/or a visual signal and/or a haptic signal and is output by the image processing device to warn the driver of the object (7).

8. The method according to claim 1, wherein the environmental region is illuminated by at least one of one taillight and one headlight, as the light source of the motor vehicle.

9. The method according to claim 1, wherein a third image of the environmental region with illumination of the environmental region with at least a second light source disposed in a distance to the at least one light source, in the inactive state of the at least one light source is provided by the camera, wherein a second subtraction image is provided from the first and the third image by the image processing device and the edge image is generated based on both the subtraction image and the second subtraction image.

10. A camera system for a motor vehicle comprising
at least one camera for providing images of an environmental region of the motor vehicle;
a light source for illuminating the environmental region wherein the light source is alternately switched with a predetermined switching frequency greater than 75 Hz between the inactive state and an active state, wherein a sequence of images of the environmental region is provided by the camera and a frame rate of the camera is adjusted depending on the switching frequency; and
an image processing device for detecting an object in the environmental region based on the images,
wherein the camera system is adapted to perform a method comprising:
providing a first image of the environmental region by a camera of the camera system with illumination of the environmental region using at least one light source of the motor vehicle such that a shadow of the object caused by the illumination is depicted in the first image;
providing a second image of the environmental region by the camera in an inactive state of the light source, wherein in the second image the illumination is omitted;
providing a subtraction image by subtracting one of the first and second images from another of the first and second images by an image processing device of the camera system;
providing an edge image from the subtraction image and detecting the object based on edges of the edge image by the image processing device, the edge image associated with the shadows in the first image caused by illumination of the at least one light source.

11. The camera system according to claim 10, wherein the camera system includes a lighting control unit for controlling the light source.

12. The camera system according to claim 10, wherein the light source includes a high-pressure gas discharge lamp and/or a xenon lamp.

13. The camera system according to claim 10, wherein the light source includes at least one light emitting diode.

14. A motor vehicle equipped with a camera system as claimed in claim 10.

* * * * *